United States Patent [19]

Schunk et al.

[11] Patent Number: 5,038,373
[45] Date of Patent: Aug. 6, 1991

[54] PROCESS FOR DETERMINING WHETHER A SUBSCRIBER IS THE CALLING OR THE CALLED PARTY

[75] Inventors: Peter Schunk, Hanover; Stefan Bock, Isernhagen, both of Fed. Rep. of Germany

[73] Assignee: Kabelmetal Electro, Hanover, Fed. Rep. of Germany

[21] Appl. No.: 411,420

[22] Filed: Sep. 22, 1989

[30] Foreign Application Priroty Data

Oct. 11, 1988 [Germany] .......................... P3834515.3

[51] Int. Cl.$^5$ .......................................... H04M 11/00
[52] U.S. Cl. .......................................................... 19/98
[58] Field of Search .................................. 379/98, 377

[56] References Cited

U.S. PATENT DOCUMENTS

| | | | |
|---|---|---|---|
| 4,304,970 | 12/1981 | Fahey et al. | 379/377 |
| 4,578,796 | 3/1986 | Charalambous et al. | 379/98 |
| 4,805,213 | 2/1989 | Schlanger | 379/377 |

Primary Examiner—Jin F. Ng
Assistant Examiner—Stella L. Woo
Attorney, Agent, or Firm—Peter C. Van Der Sluys

[57] ABSTRACT

A process is disclosed for the transmission of data between subscribers of a public dial telephone system in which at least a telephone, a data modem having a tone transmitter and a tone receiver, and a data device are connected to the dial telephone system. The data modem is equipped with a circuit for ringing voltage detection with bridging of ringing pauses. For transmission of a data answering tone and, if applicable, for selection of a channel position, in the case of manual operation, after operation of a data key, a distinction between the 'called' state and 'calling' state is made according to whether, at the start of loop current, a ringing voltage was detected by the data modem or not.

6 Claims, 5 Drawing Sheets

PROCESS FOR DETERMINING WHETHER A SUBSCRIBER IS THE CALLING OR THE CALLED PARTY

BACKGROUND OF THE INVENTION

1. Field of the Invention

The present invention relates to a process for the transmission of data between subscribers of a public dial telephone system and, more particularly, to a process for use with a system including: a telephone, a data modem having a tone transmitter and a tone receiver and a data device, all connected to the dial telephone system.

2. Description of the Prior Art

Switching from telephoning to data transmission by a data modem may be carried out either automatically or manually, by operation of a data key. Before switching to the data transmission mode, it must be determined for each subscriber whether the subscriber is the calling or the called party, as described in German Patent 25 02 681, equivalent to GB PS 1,494,717.

A process for making such a determination is prescribed in the CCITT Standards presently in effect. Modems suitable for use in a public dial telephone system are described, for example in CCITT Standards V.21 for duplex operation and V.23 for half duplex operation. CCITT Standard V.25 prescribes the transmission of a data answering tone by a called subscriber prior to data transmission. This tone serves, on the one hand, to cancel echo suppressors on the transmission path and on the other hand, reception of the data answering tone informs a calling subscriber that the called subscriber is equipped with a data modem and that a data exchange with this subscriber is therefore possible. The calling subscriber, or the subscriber's data modem, must also be able to detect the end of the data answering tone, because only then can the transmission of data be started. According to CCITT, the data answering tone should last for 3.3±0.7 seconds and should have a frequency of 2100 Hz.

The data modems for both the calling and called subscribers must be capable of detecting, before receiving the data transmission, whether 'its' subscriber is being called, (called state) or is itself the calling party (calling state), so that, as the called party, it can effect the transmission of the data answering tone. For duplex operation, a knowledge of the called state or calling state is also required for selection of a proper channel position, because, according to CCITT, the data of the calling subscriber are, in principle, transmitted to the called subscriber via Channel 1, whereas Channel 2 serves for transmission in the opposite direction. CCITT Standard V.25 describes the procedure for establishment of the appropriate data connection in the case of an automatic call and of automatic call answer. However, no detailed statements concerning manual operation are made in the CCITT Standards. The subscribers of two manual stations are advised to make arrangements with each other for the initiation of data transmission.

German Patent 12 75 093 described a process for automatic channel selection for 2-channel or duplex data modems. For each subscriber, a channel switching relay is assigned to these data modems. In the case of the calling subscriber, only the subscriber's own dial pulses are selected as a criterion for selection of the transmission channel, while only the arriving ringing characters are used in the case of the called subscriber. The switching for channel assignment is effected by a flip-flop.

In the process according to German Patent 25 02 681 mentioned above, to differentiate between the calling state and the called state, a circuit with different timers is used, which timers analyze whether the data answering tone arrived within a time that is adjustable on one of the timers or not. The timer is started with the connection of the data modem to the telephone line. Thus, precise timing standards must be adhered to.

SUMMARY OF THE INVENTION

The present invention discloses a process by which the subscribers of a public dial telephone system can establish a connection to a manual modem in a manner completely different from the previously described procedure.

The process of the invention is based on the use of a data modem with a circuit for ringing voltage detection with bridging of the ringing pauses. In the case of manual operation, after actuation of the data key, a distinction between the 'called' state and the 'calling' state is made according to whether, at the start of loop current, a ringing voltage was detected by the data modem or not.

The circuit for ringing voltage detection includes a timing element for bridging the ringing pauses. The data modem recognizes the application of a ringing voltage if its own subscriber is called by another subscriber. If a loop current flows after detection of a ringing voltage, because the receiver of the telephone has been picked up by the subscriber, the data modem detects from the sequence—first ringing voltage, then loop current—that its subscriber is being called. After depression of the data key, the data modem then causes transmission of a data answering tone for cancellation of the echo suppressors and, in the case of duplex operation, switches the data device to Channel 2 as the called subscriber. If, on the other hand, loop current flows without the previous application of a ringing voltage, then the data modem detects from the corresponding sequence—no ringing voltage, but loop current—that its subscriber is the calling party. No data answering tone is transmitted. In duplex operation, the data device of a calling party is switched to Channel 1 after operation of the data key.

Thus, in the present invention, the transmission of the data answering tone and, if applicable, the channel selection, are independent of any timers. Specifically the criterion of whether the data answering tone arrives within a certain time or not is of no importance for the detection of the called state or calling state. Instead, this detection is already made before transmission of the data answering tone and is responsible for its transmission.

The data modems are equipped with a storage which is connected with a microprocessor to form a microcontroller. The particular sequence, whether the ringing voltage was present at the start of the loop current or not, remains stored until the loop current is interrupted or until the loop current flows again after an interruption. Specific cancellation of the stored information is not required. The data transmission can be interrupted by the data device when, for example, two subscribers with manual stations wish to speak with each other to exchange information. Data transmission can resume without the need for again determining which party is the called or calling party. The channel position in the case of duplex operation is also maintained in the storage so that the data exchange can be continued without delay after the receivers of the telephones are replaced.

Thus, the present invention provides a process for the transmission of data between subscribers of a public dial telephone system in which at least a telephone, a data modem having a tone transmitter and a tone receiver, and a data device are connected to the dial telephone system. The data modem is equipped with a circuit for ringing voltage detection with bridging of ringing pauses. For transmission of a data answering tone and, if applicable, for selection of a channel position, in the case of manual operation after operation of a data key, a distinction between the 'called' state and the 'calling' state is made on the basis of whether, at the start of loop current, a ringing voltage was detected by the modem or not.

DETAILED DESCRIPTION OF THE PREFERRED EMBODIMENT

Modems at subscriber stations can be equipped for automatic or manual operation. Before establishing a data connection, the data modem must detect in each station whether its station is itself calling or is being called, so that the data answering tone can be transmitted and the associated data device can, if necessary for duplex operation, be connected with the correct channel.

There are the following eight possibilities for connection between modems, in which an automatic station is designated by A and a manual station is designated by M:

A is calling A
A is calling M
A is being called by A
A is being called by M
M is calling M
M is calling A
M is being called by M
M is being called by A The way in which the connection is established in automatic stations is described in V.25 of the CCITT Standards. The present process therefore does not apply to data exchange between automatic stations, but only if at least one of the two stations is a manual station.

Figure 1:
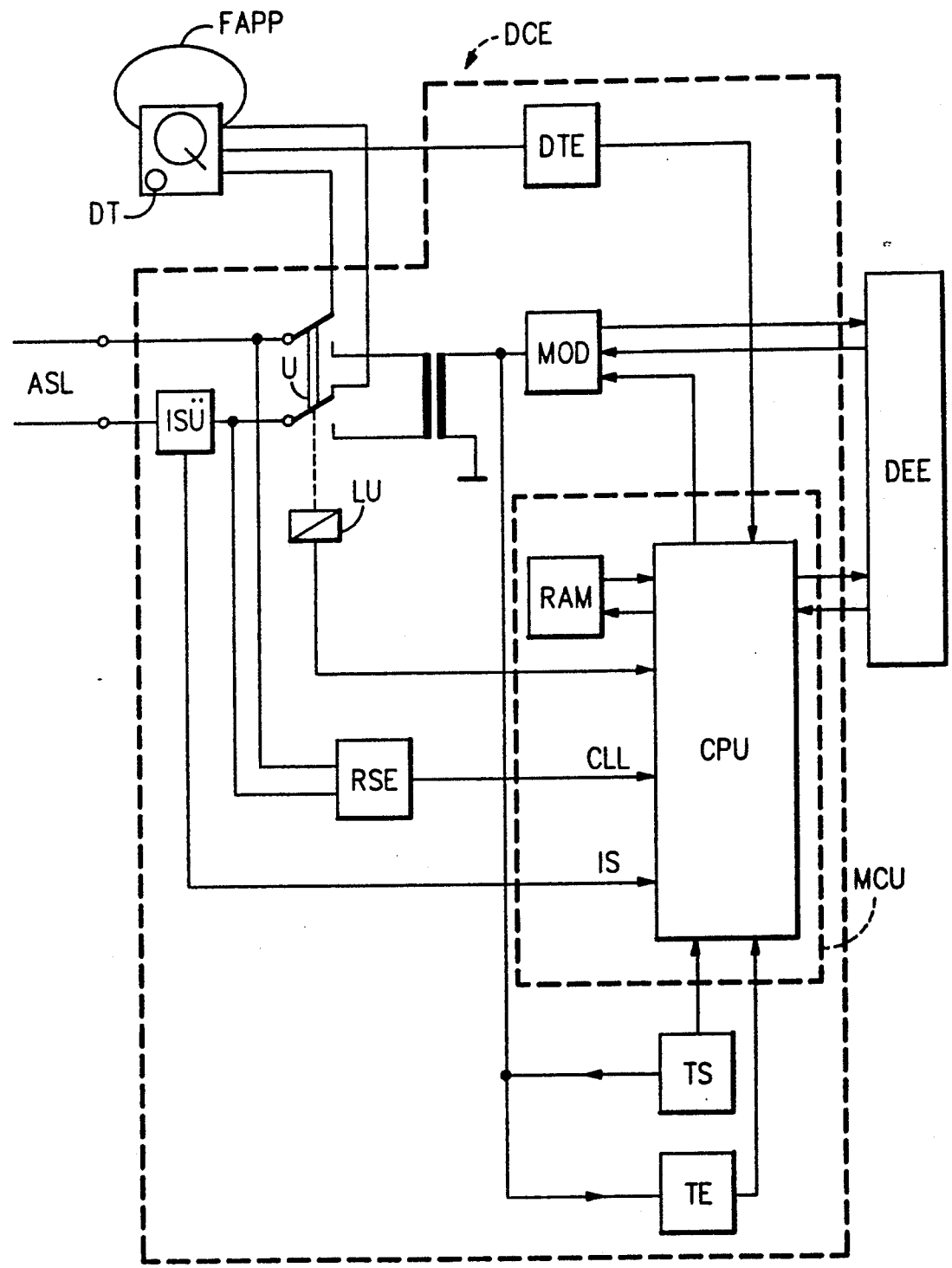
FIG. 1 is a block diagram of a subscriber station used to practice the present invention.

In FIG. 1, a dot-and-dash line surrounds the components of a data modem, DCE, needed to practice the present invention. A data modem of this type is also referred to as data communications equipment. A data device, DEE, is connected to the data modem by means of appropriate connections. In addition, the subscriber also has a telephone apparatus, FAPP, with a data key, DT, which is not part of the data modem.

The heart of the data modem is a microprocessor CPU which controls all sequences of modem operation. Connected to the CPU is a memory, RAM, in which specific functions can be stored, such as, for example, telephone numbers of specific subscribers of a dial telephone network. The RAM can be combined with the CPU and additional inputs and outputs of the CPU to form a microcontroller, MCU. The data modem also includes a tone transmitter, TS, and a tone receiver, TE, both of which are connected to the CPU.

A loop current monitoring unit, ISÜ, is provided in series with a telephone line, ASL, to detect whether loop current is flowing and for providing in response thereto a loop current signal, IS. A ringing voltage detector unit, RSE, is connected across the line ASL to detect ringing voltage and provide a signal CLL indicating the presence of a ringing voltage. ISÜ and RSE are also connected with the CPU to provide the IS and CLL signals thereto. A data key detection unit, DTE, monitors whether the data key, DT, is depressed and also provides a signal to the CPU, and to a modem device, MOD, for transmission of the data from DEE to telephone line, ASL, of the dial telephone network.

The connection of the modem, MOD, to the ASL takes place by means of a relay, LU, which actuates a changeover switch U. When the modem, MOD, is connected to the ASL, the FAPP is disconnected. In FIG. 1, the changeover switch, U, is in the position in which the FAPP is connected to the ASL. In that case, therefore, the data modem is not connected to the ASL.

As seen from the above, the data modem of each manual station is equipped with a circuit for ringing voltage detection RSE, by means of which a frequency and amplitude evaluation of the ringing voltage signals is carried out. This circuit can be referred to as an electronic circuit with band pass properties. It includes a timing element for bridging the pauses between the ringing voltage signals. This bridging is required so that, if the loop current starts during one of the pauses, the subscriber is not erroneously identified by the data modem as the calling party. As the time element one can use, for example, a retriggerable monoflop, which holds the information, for example, for six seconds.

Figure 2:
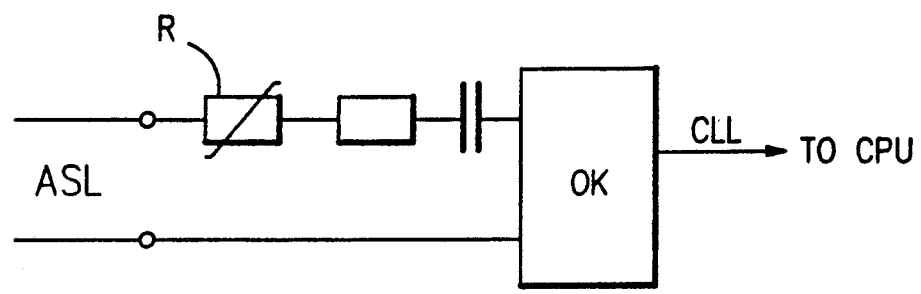
FIG. 2 is a schematic diagram of a ringing voltage detector used in the present invention.

FIG. 2 shows an RSE in a simple embodiment. The ringing voltage, originating from another subscriber, is transmitted by means of the ASL and is detected, for example, by the Resistor R. The RSE includes an optical coupler OK for DC decoupling, from which the ringing voltage signal CLL originates and is conducted to the CPU.

Figure 3:
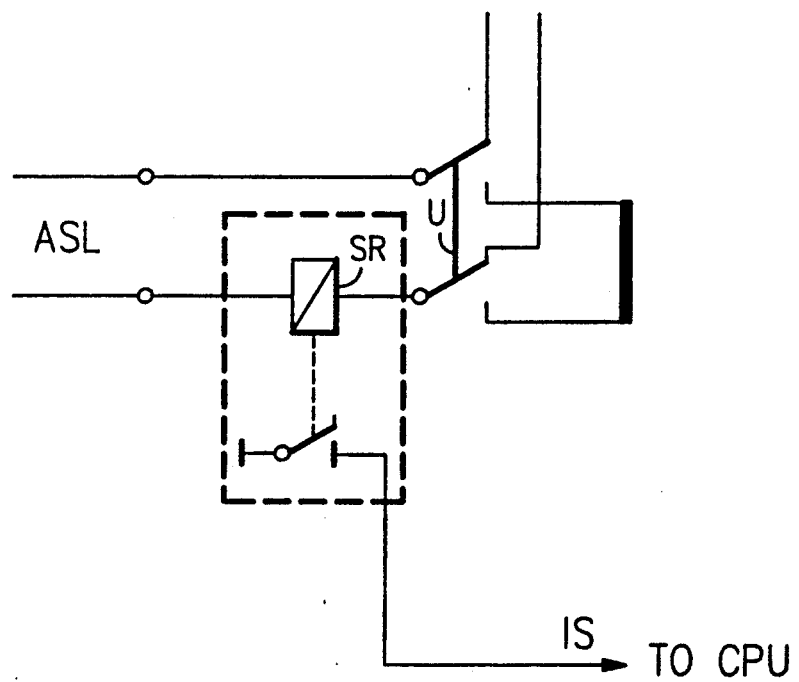
FIG. 3 is a schematic diagram of a loop current monitoring circuit used in the present invention.

FIG. 3 shows an ISÜ in a simple embodiment, which consists of a current-sensitive relay SR, which responds as soon as a loop current flows to activate a switch contact to provide the IS signal.

Figure 4:
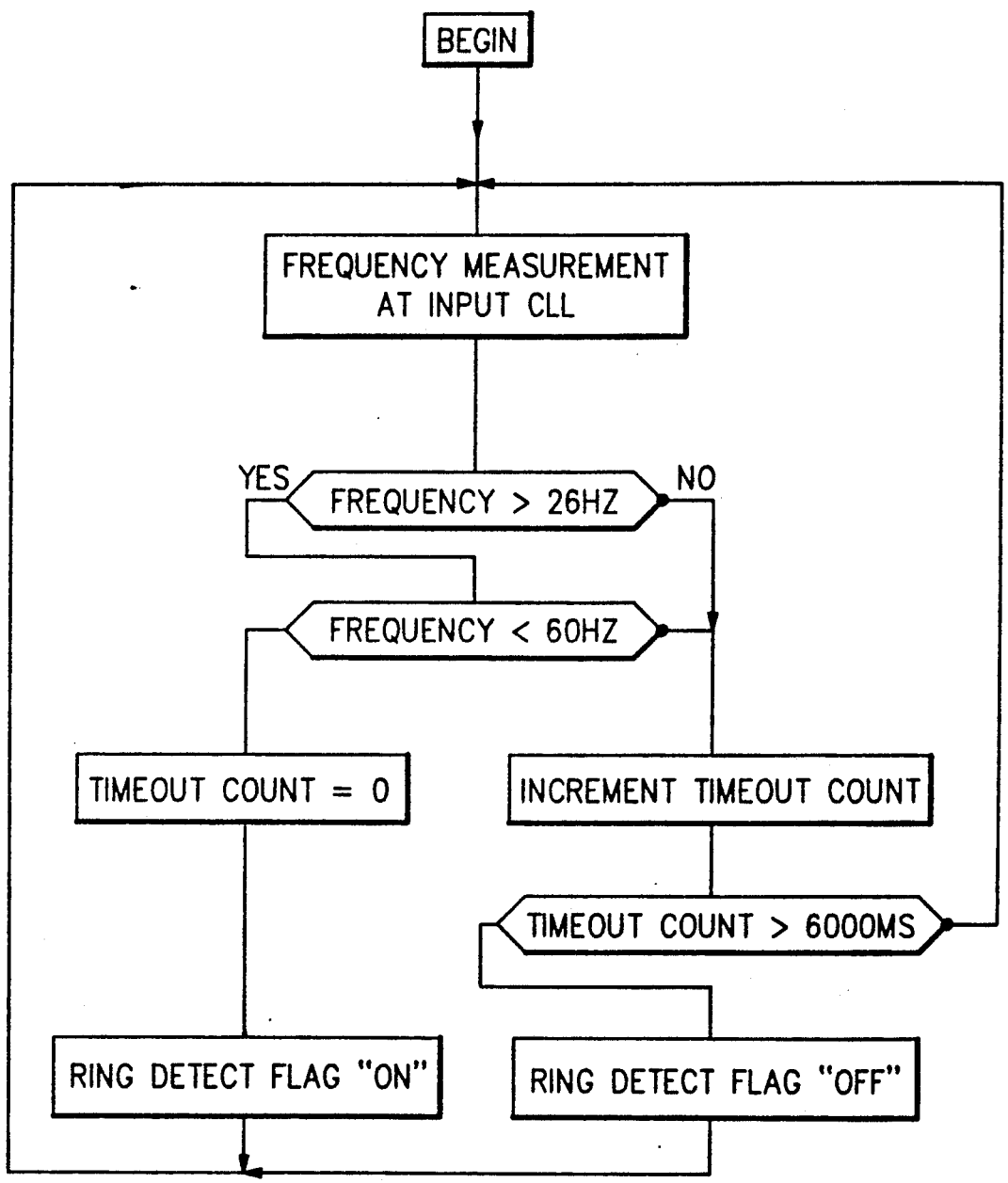
FIG. 4 is a flow chart showing a process for ring voltage detection.
Figure 5:
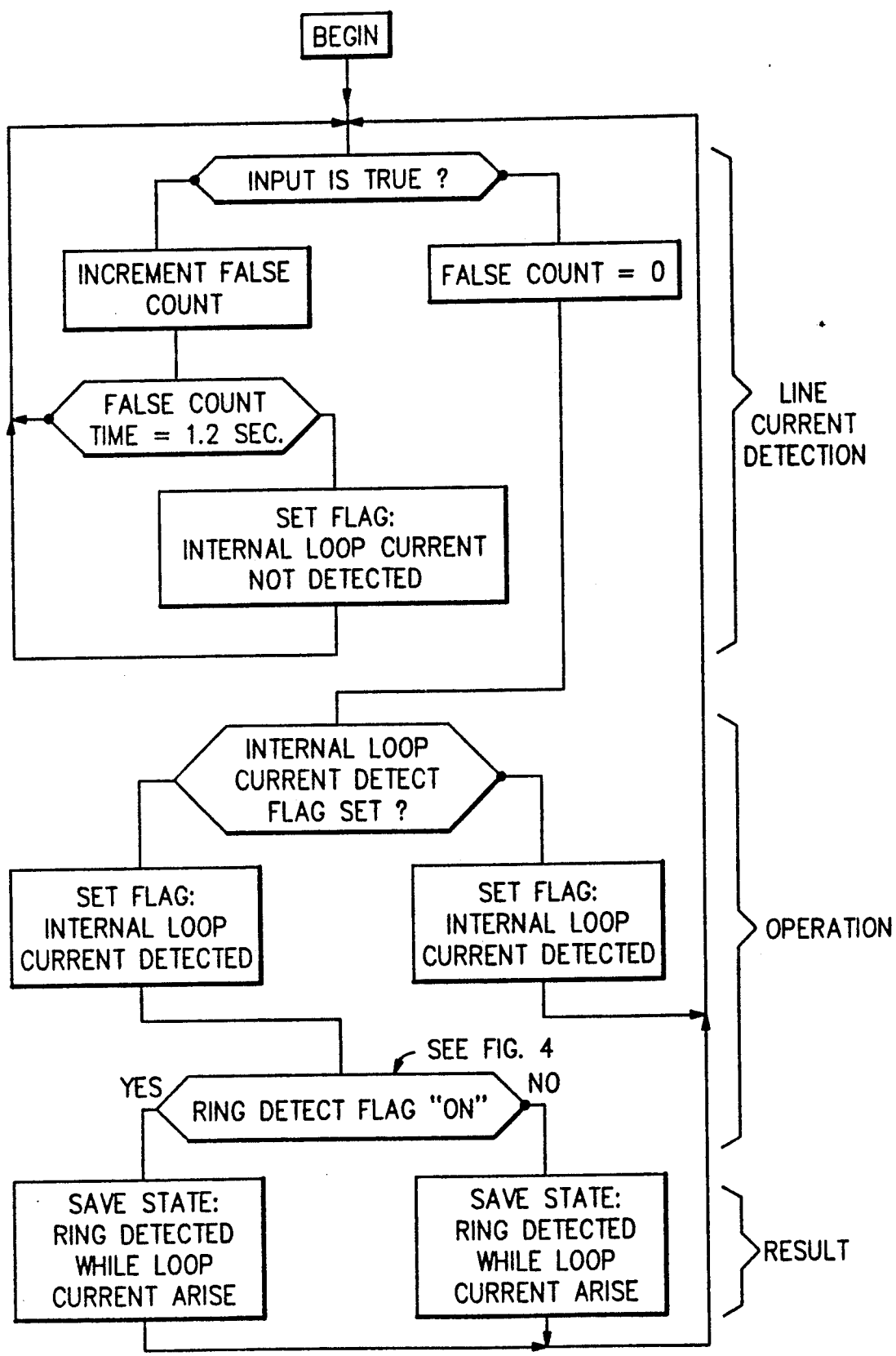
FIG. 5 is a flow chart showing a process for determining the called or calling state.
Figure 6:
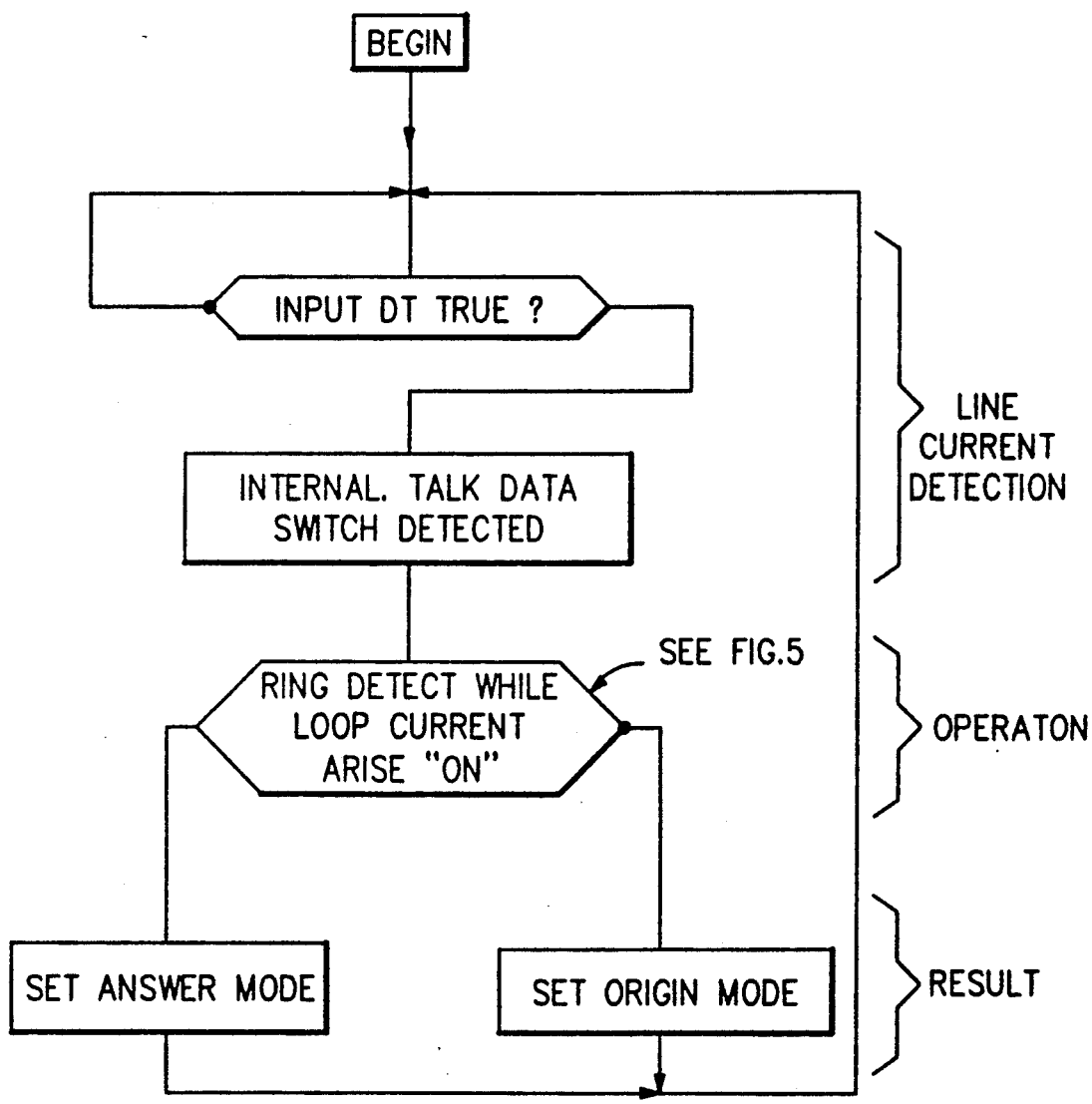
FIG. 6 is a flow chart of a process used by a data modem to determine if its associated station is a called or a calling station.

In the flow charts of FIGS. 4, 5 and 6, the diamond-shaped boxes in each case represent decision elements. If, in the case of an inquiry, the inquired-about signal is correctly present, the decision element passes on a 'yes' by means of a simple line, otherwise it passes on a 'no' to the output identified by a thick dot.

FIG. 4 shows a flow chart for ringing voltage detection with frequency evaluation. The amplitude evaluation also mentioned above is carried out directly in the RSE. If the amplitude of an incoming ringing voltage signal is too low, no signal CLL is transmitted to the CPU. The frequency evaluation is carried out by means of an electronic circuit with band pass properties. The lower limit of the band pass is 26 Hz and the upper limit is 60 Hz. If a signal of this type is detected, the timing element (timeout counter) is set back and the CLL signal is generated. In the intervals between the ringing voltage signals, no signal is detected. However, the intervals are bridged for six seconds (6,000 milliseconds) by means of the timing element (increment timeout count). Because the next signal normally arrives after four seconds, the left-hand route (yes) in FIG. 4 is retained. Only if no new signal arrives after more than 6,000 milliseconds is the signal CLL not generated. In that case, therefore, no ringing voltage was detected. The flags and timeout counter are parts of the MCU.

FIG. 5 shows a loop current detection flow chart. The end result in this case states that the data modem according to the left-hand box at the very bottom detects the 'called' state, because the ringing voltage (yes) was detected before the start of the loop current. According to the right-hand box at the very bottom, on the other hand, the 'calling' state is detected, because no ringing voltage was detected before the start of the loop current.

FIG. 6 shows a flow chart of the sequence when the data modem is connected to the ASL by actuation of the data key DT. The bottom left-hand box is correct when the subscriber is called. It then sends the answer tone to cancel the echo suppressors. The bottom right-hand box is correct when the subscriber himself is the calling party.

The two possibilities, that the station itself is being called (1) or that the station is calling (2) are described briefly below:

(1) The Subscriber is being called

The telephone, FAPP, of the station rings, so that the data modem, DCE, detects the application of a ringing voltage. The subscriber lifts the receiver of his telephone instrument and, as a result loop current flow. The sequence—application of the ringing voltage and subsequent loop current—is detected by the data modem and stored. After appropriate matching with the calling station or the realization that an automatic station is calling, the subscriber presses his data key, DT, to initiate data exchange. The data modem knows that its station has been called and causes the transmission of the data answering tone and connects its data device with Channel 2, if applicable. The data exchange can then be started.

The storage of the information explained above is retained in the data modem as long as the telephone connection exists, as indicated by the presence of loop current. After an interruption of the data exchange, for a resumption of voice mode telephone connection, the data modem automatically again transmits a data answering tone, without the necessity of again detecting whether the station has been called or is itself calling, when data exchange is again started. The subscriber in such an event presses his data key and thereby activates the answering tone generator of his own station.

(2) The Subscriber is calling

As compared to the sequence described in (1), in this case the only difference is that the loop current is flowing without the previous application of a ringing voltage. This sequence is also detected in the data modem and is stored. The data modem thus knows when the subscriber presses his data key, DT, that the subscriber is the calling party and the associated data device DEE is connected to Channel 1, if applicable. The remaining sequence of the data exchange and the receipt of the storage are unchanged from (1).

What is claimed is:

1. In a process for the transmission of data between subscribers of a public dial telephone system of the type in which at least a telephone, a data modem with a tone transmitter and a tone receiver, and a data device are connected to the dial telephone system, and switching from telephoning to data transmission by the data modem is carried out either automatically or manually, by operation of a data key, and in which, by means of the data modem, before switching to data transmission, it is determined for each subscriber whether the subscriber is the calling or the called party, a process for determining whether a subscriber is in a calling or a called state, comprising the steps of:
   detecting ringing voltage;
   bridging pauses between ringing voltage pulses;
   detecting loop current; and
   determining if the ringing voltage occurred prior to the loop current, whereby ion the case of manual operations, after operation of the data key, a distinction between the called state and the calling state is detected according to whether, at the start of the loop current, a ringing voltage was detected by the data modem or not.

2. A process according to claim 1, additionally comprising the step of storing the detected state until the loop current is interrupted or until the loop current starts again.

3. A process for determining at a subscriber station if the subscriber is a called party or a calling party in a public dial telephone system, comprising the steps of:
   . detecting ringing voltage;
   bridging pauses between ringing voltage pulses;
   detecting loop current; and
   determining the calling or called state of the party, wherein the presence of ringing voltage at the start of loop current indicates a called state and the presence of loop current prior to ringing voltage indicates a calling state.

4. A process as defined in claim 3, wherein the determined state is stored until loop current is interrupted or restarted.

5. A subscriber station, for connection to a line of a public dial telephone system, including a modem for data transmission, said station including:
   means for detecting ringing voltage on said line and providing a signal indicative of the presence of a ringing voltage;
   means for detecting loop current on said line and for providing a signal indicative of the presence of loop current; and
   logic means, connected to receive said signals, and in response to the signal sequence, for detecting if the station is in a calling state or a called state, whereby the presence of a ringing voltage prior to the start of loop current indicates a called state, and loop current without a ringing voltage indicates a calling state.

6. A subscriber station as defined in claim 5, additionally including means for storing the detected state.

* * * * *